(12) United States Patent
Hayashi et al.

(10) Patent No.: US 7,393,137 B2
(45) Date of Patent: Jul. 1, 2008

(54) CLINICAL THERMOMETER

(75) Inventors: Yasuhiro Hayashi, Sayama (JP); Isamu Kobayashi, Kodaira (JP); Tetsuya Yamamoto, Sayama (JP)

(73) Assignee: Citizen Holdings Co. Ltd., Tokyo (JP)

( * ) Notice: Subject to any disclaimer, the term of this patent is extended or adjusted under 35 U.S.C. 154(b) by 0 days.

(21) Appl. No.: 10/567,429

(22) PCT Filed: Sep. 30, 2004

(86) PCT No.: PCT/JP2004/014375

§ 371 (c)(1),
(2), (4) Date: Feb. 6, 2006

(87) PCT Pub. No.: WO2005/031294

PCT Pub. Date: Apr. 7, 2005

(65) Prior Publication Data

US 2006/0280225 A1 Dec. 14, 2006

(30) Foreign Application Priority Data

Sep. 30, 2003 (JP) .................... 2003-339619
Sep. 30, 2003 (JP) .................... 2003-339620

(51) Int. Cl.
*G01K 1/00* (2006.01)
*G01K 7/00* (2006.01)
*G08B 6/00* (2006.01)

(52) U.S. Cl. .................. 374/208; 340/407.1; 340/693.9

(58) Field of Classification Search ................. 374/208; 340/407.1, 693.9
See application file for complete search history.

(56) References Cited

U.S. PATENT DOCUMENTS

| 4,579,464 | A * | 4/1986 | Yamazaki et al. | 374/163 |
| 4,846,583 | A * | 7/1989 | Yamamoto | 374/163 |
| 5,892,448 | A * | 4/1999 | Fujikawa et al. | 340/584 |
| 6,394,648 | B1 * | 5/2002 | Tseng | 374/208 |
| 6,890,096 | B2 * | 5/2005 | Tokita et al. | 374/163 |
| 6,966,694 | B2 * | 11/2005 | Kihira et al. | 374/208 |
| 2005/0117626 | A1 * | 6/2005 | Kobayashi et al. | 374/163 |

FOREIGN PATENT DOCUMENTS

| JP | 61062831 | A * | 3/1986 |
| JP | 01018031 | A * | 1/1989 |
| JP | 3-55072 | | 12/1991 |
| JP | 06241912 | A * | 9/1994 |
| JP | 08-136354 | | 5/1996 |
| JP | 08-304189 | | 11/1996 |

(Continued)

*Primary Examiner*—Gail Verbitsky
*Assistant Examiner*—Mirellys Jagan
(74) *Attorney, Agent, or Firm*—Smith, Gambrell & Russell, LLP

(57) ABSTRACT

A temperature measuring element (2a) for detecting a temperature, a display panel (9) for displaying the temperature measured by the temperature measuring element (2a), an operation switch (11) for predetermined operation, and a vibration generator (12) for notifying that an electronic clinical thermometer is in a predetermined state are arranged in the order named in the longitudinal direction of the electronic clinical thermometer. The display panel, the vibration generator, and a circuit board are held in one inside frame (13), and are fitted together with the inside frame (13) into a sheath case (1) and assembled.

14 Claims, 7 Drawing Sheets

FOREIGN PATENT DOCUMENTS

| JP | 09-218106 | 8/1997 |
| JP | 10-048060 | 2/1998 |
| JP | 11-304597 | 11/1999 |
| JP | 2000-121448 | 4/2000 |

* cited by examiner

CLINICAL THERMOMETER

TECHNICAL FIELD

The present invention relates to an electronic clinical thermometer having a vibration motor.

BACKGROUND ART

Electronic clinical thermometers of a known type such that a user is notified of completion of thermometry are described in Japanese Patent Application Laid-Open Nos. 11-304597, 8-304189, 8-136354, etc., for example. These electronic clinical thermometers require a vibration generator for generating vibration and an operation switch for turning on and off power supply to the vibration generator, in addition to a temperature measuring element for detecting temperature and a display device for displaying the measured temperature.

Incidentally, power that is required by the drive of the vibration generator is so high that vibration of the vibration generator must be transmitted as efficiently as possible to a user's hand that holds the clinical thermometer. It is to be required that the display device be located in position where a user can see it easily when the user holds the clinical thermometer in his/her most natural posture, that a source of vibration (vibration generator) be located near the user's hand (including its fingers), and that the operation switch for turning on and off the power supply to the vibration generator be situated in an easily operable position (e.g., corresponding to the user's thumb). However, none of the aforementioned prior arts fulfill these requirements. More specifically, in the clinical thermometer described in Japanese Patent Application Laid-Open No. 11-304597, as shown in FIG. 10, a vibration generator 22 and a display device 23 are arranged in front (on the side of a temperature measuring element 21) and in back with respect to its longitudinal direction, respectively, and an operation switch 24 is located on a side face of the display device 23. If the electronic clinical thermometer is grasped in an easy position for the operation of the operation switch, therefore, the display device 23 is almost hidden under the hand (including its fingers) and rendered unseeable. Further, the distance from the vibration generator 22 to the hand is so long that the vibration damps and ceases to be satisfactorily transmitted to the hand. If the clinical thermometer is grasped in a position that is susceptible to the vibration of the vibration generator 22, on the other hand, the display device 23 is situated behind the hand and rendered hardly seeable, and the operation switch 24 becomes hard to operate.

In the clinical thermometer described in Japanese Patent Application Laid-Open No. 8-304189, as shown in FIG. 11, a display device 33 and a vibration generator 32 are arranged in front (on the side of a temperature measuring element 31) and in back with respect to its longitudinal direction, respectively, although the location of an operation switch is not described. In the clinical thermometer described in Japanese Patent Application Laid-Open No. 8-136354, as shown in FIG. 12, a vibration generator 42 and a display device 43 are arranged in front (on the side of a temperature measuring element 41) and in back with respect to its longitudinal direction, respectively, although the location of an operation switch is not described either.

DISCLOSURE OF THE INVENTION

An electronic clinical thermometer according to the present invention comprises a temperature measuring element for detecting a temperature, a display device for displaying the temperature measured by the temperature measuring element, an operation switch for predetermined operation, and a vibration generator for notifying that the electronic clinical thermometer is in a predetermined state. Besides, the electronic clinical thermometer has a width, a thickness, and a longitudinal length longer than those dimensions, and the operation switch and the vibration generator are arranged on one side of the display device in the longitudinal direction of the electronic clinical thermometer.

In the electronic clinical thermometer according to the present invention, the temperature measuring element, the display device, the operation switch, the vibration generator, and a battery storage portion may be arranged in the order named in the longitudinal direction of the electronic clinical thermometer.

The vibration generator may be a vibration motor having a rotating shaft and an eccentric weight rotatable around the rotating shaft and extending long in the direction of the rotating shaft, and the vibration motor may be located so that the rotating shaft thereof extends at right angles to the longitudinal direction of the electronic clinical thermometer.

The electronic clinical thermometer may have a circuit board on which given electronic components are mounted, and the circuit board may be located so as not to overlap the vibration generator on a plane in the thickness direction thereof.

The display device, the vibration generator, the circuit board, a battery holding portion, etc. may be held in one inside frame so that they can be fitted together with the inside frame into a sheath case of the electronic clinical thermometer.

The vibration generator may be actuated when body temperature measurement is started or when the body temperature measurement is finished.

According to the electronic clinical thermometer of the present invention constructed in this manner, vibration generated by the vibration generator can be easily transmitted to one hand, and the display device is directed to a position where a user can see it easily when the electronic clinical thermometer is grasped by the hand with its thumb on the operation switch.

BEST MODE FOR CARRYING OUT THE INVENTION

Figure 1:
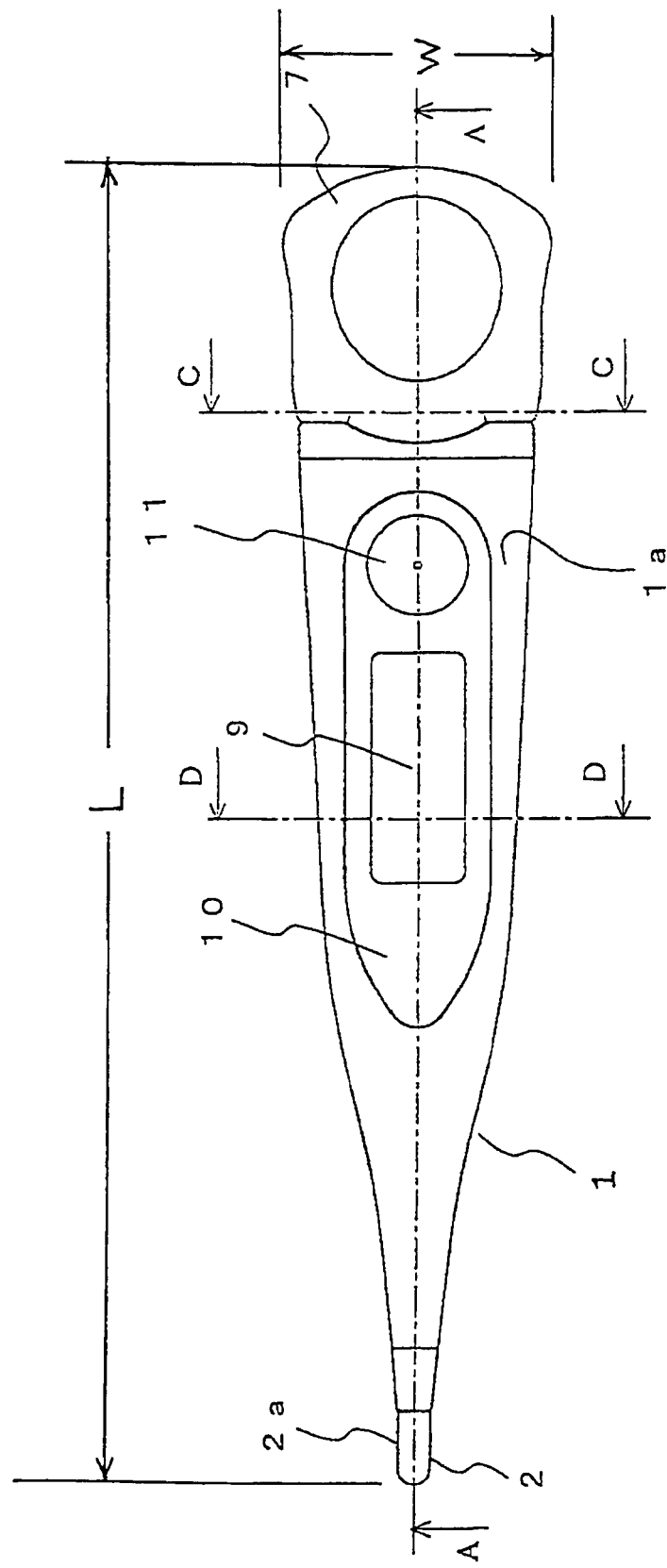
FIG. 1 is a plan view of an electronic clinical thermometer according to a first embodiment of the present invention.
Figure 2:
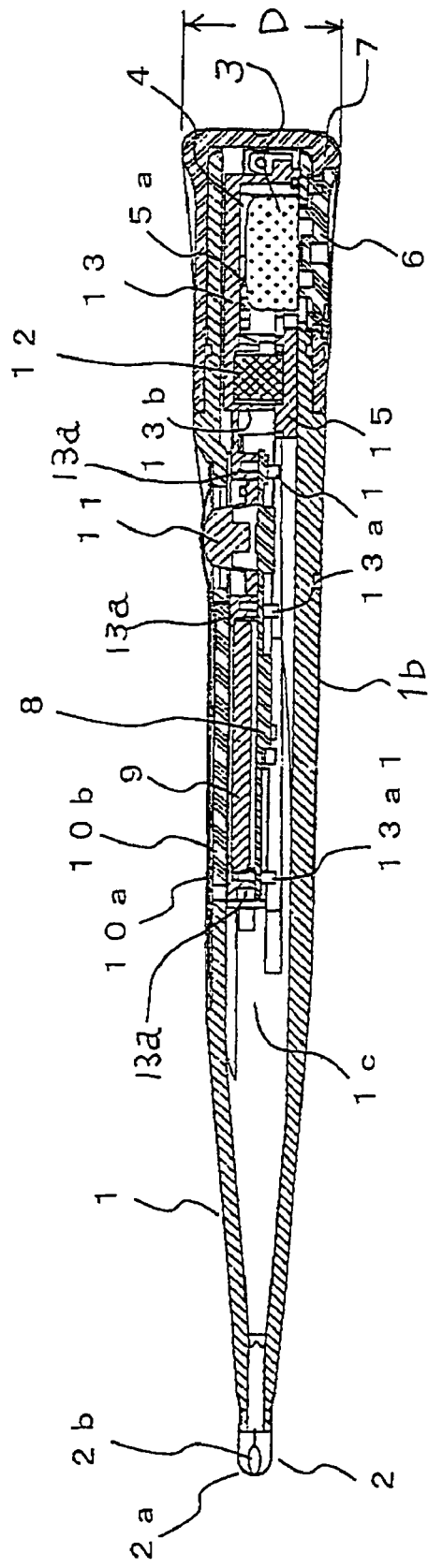
FIG. 2 is a sectional view taken along line A-A of FIG. 1.

As shown in FIGS. 1 and 2, an electronic clinical thermometer has a longitudinal length L longer than a width W and a thickness D. A temperature measuring portion 2 for detecting temperature is provided on one end side of a sheath case 1 that is molded out of resin. A battery storage portion 4 for storing a battery 3 is provided on the other end. The temperature measuring portion 2 is formed of a sensor cap 2a and a thermistor 2b (temperature measuring element) contained in the sensor cap 2a. The battery storage portion 4 is provided with a negative-pole side battery spring 5a, a positive-pole side battery spring 5b (FIG. 4), a battery lid 6, and a cap 7. The battery 3 is set in the battery storage portion 4 as the battery lid 6 is opened and closed. The cap 7 is fitted on the sheath case 1.

A circuit board 8, which is mounted with electronic components such as a chip capacitor, semiconductor device, chip resistor, etc., and a liquid crystal display device (liquid crystal display panel) 9 are arranged in an internal space (hollow portion 1c) of the sheath case 1. The circuit board 8 is connected to the thermistor 2b of the temperature measuring portion 2 by a conductor wire (not shown). The liquid crystal display panel 9 displays a temperature measured by the thermistor 2b. Heat transferred from an organism to the sensor cap 2a is detected by the thermistor 2b. Based on a signal from the thermistor 2b, the circuit board 8 computes data such as temperature, and displays the result of the computation on the liquid crystal display panel 9.

In the hollow portion 1c of the sheath case 1, moreover, an operation switch 11 of a push-button type, which is located adjacent to the liquid crystal display panel 9, and a vibration motor 12 (vibration generator), which is located adjacent to the operation switch 11, are arranged in the longitudinal direction of the electronic clinical thermometer.

Thus, in the hollow portion 1c of the sheath case 1, the liquid crystal display panel 9 is located in front of the operation switch 11 (on the side of the temperature measuring portion 2), and the vibration motor 12 is located at the back (on the side of the battery storage portion 4). With respect to the liquid crystal display panel 9, moreover, the operation switch 11 and the vibration motor 12 are located on one side (right-hand side of FIG. 1) of the electronic clinical thermometer, and the temperature measuring portion 2 is located on the other side. The circuit board 8 is spaced from the vibration motor 12 in the longitudinal direction of the electronic clinical thermometer lest the circuit board 8 and the vibration motor 12 overlap each other in the thickness direction of the electronic clinical thermometer.

A square window (through hole) is formed in that region of the sheath case 1 above the liquid crystal display panel 9, and a transparent display plate 10b for protecting the liquid crystal display panel 9 is fitted in the window. Further, the display plate 10b and the operation switch 11 are covered by a filmy windshield plate 10a that is attached to the outer surface of the sheath case 1. The liquid crystal display panel 9 can be visually confirmed from an upper surface 1a of the sheath case 1 (that carries the operation switch 11 thereon) through the windshield plate 10a and the display plate 10b.

Elements such as the circuit board 8, liquid crystal display panel 9, vibration motor 12, and battery 3 are held by means of one inside frame 13. This inside frame 13 is composed of a first holding portion 13a for holding the circuit board 8 and the liquid crystal display panel 9, a second holding portion 13b for holding the vibration motor 12, and the battery storage portion 4.

Figure 6:
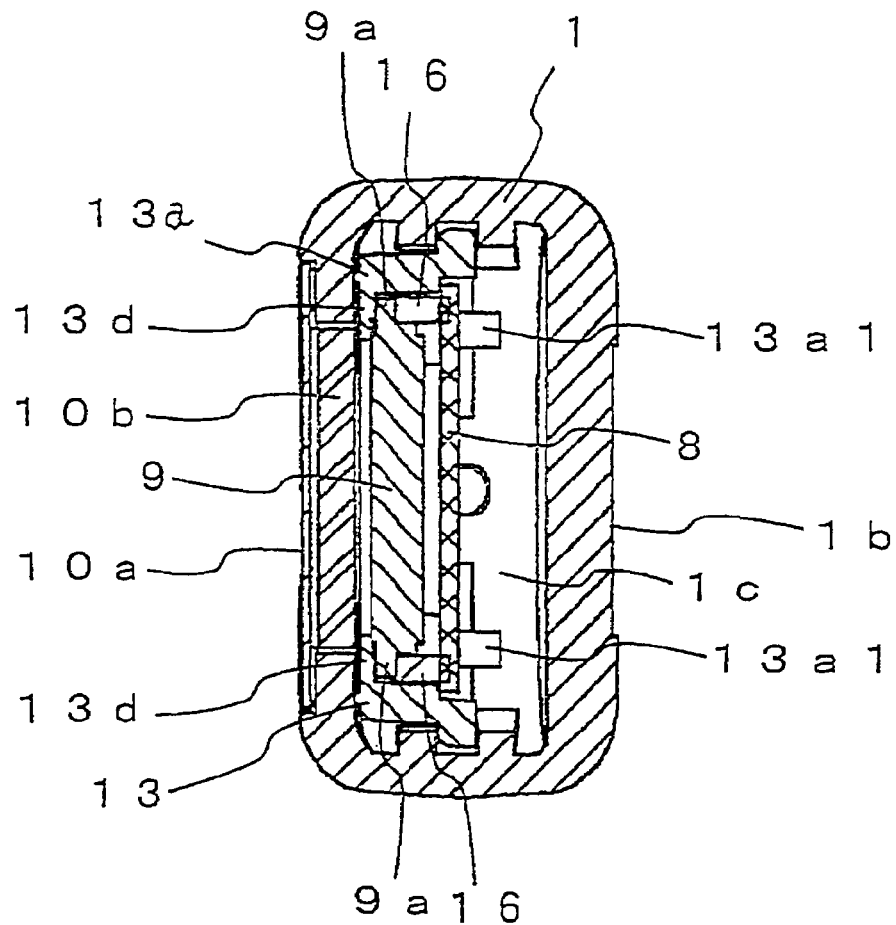
FIG. 6 is a sectional view taken along line D-D of FIG. 1.

The first holding portion 13a of the inside frame 13, like the sheath case 1, is formed having a square window (through hole) above the liquid crystal display panel 9. Formed around this window portion, moreover, is a support portion 13d that supports the outer periphery of the display surface side of the liquid crystal display panel, as shown in FIG. 6. Further, an electrically conductive rubber 16 for electrical conduction to the circuit board 8 is located on a terminal portion 9a of the liquid crystal display panel 9, and the circuit board 8 is connected to the conductive rubber 16.

The first holding portion 13a is provided with a plurality of columnar protrusions 13a1 that project upward. On the other hand, the circuit board 8 is formed having a plurality of holes (not shown) that receive the columnar protrusions 13a1, individually. The circuit board 8 is fixed to the first holding portion 13a of the inside frame 13 by inserting the columnar protrusions 13a1 of the first holding portion 13a into the holes of the circuit board 8 and applying caulking process to their distal ends.

Figure 7:
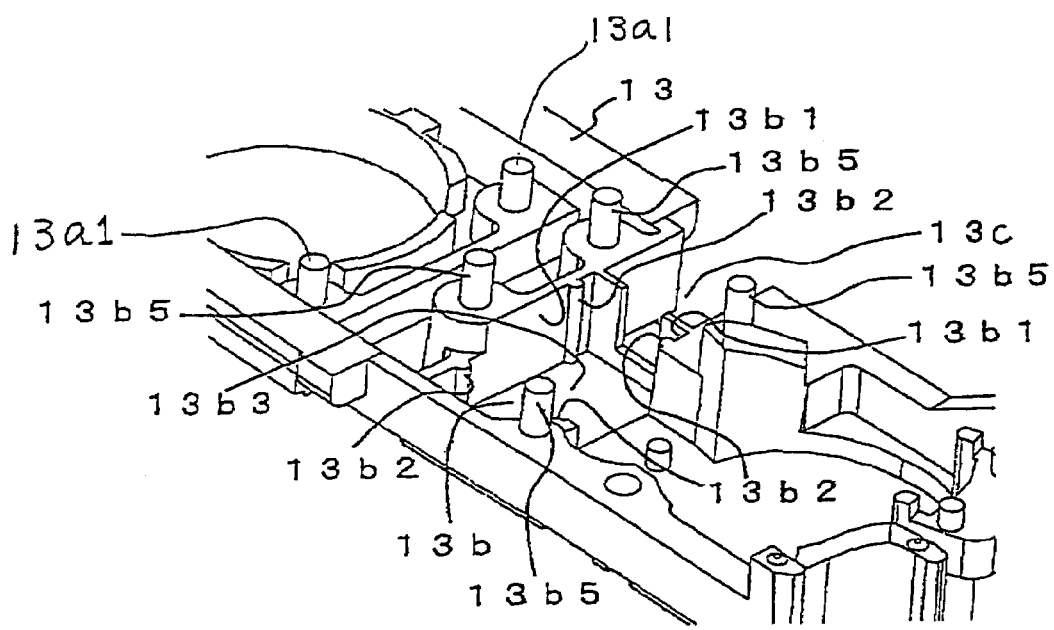
FIG. 7 is a perspective view of a vibration motor storage recess formed in the inside frame.

As shown in FIG. 7, the second holding portion 13b has a motor storage recess, which is formed of a vertical wall surface 13b1 and a horizontal bottom surface 13b3. This motor storage recess opens in a lower surface 1b of the electronic clinical thermometer (surface opposite from the side on which the operation switch 11 is located). Further, four columnar portions 13b5 protrude downward (in the direction opposite the bottom surface of the motor storage recess) from an edge of the vibration motor storage recess of the second holding portion 13b. A lid member 15 (FIG. 4) is fixed to the second holding portion 13b by passing the four columnar portions 13b5 individually through four holes 15b in the lid member 15 and applying caulking process to their distal ends. As shown in FIG. 2, the lid member 15 that is fixed to the second holding portion 13b engages and is supported by the lower inner side face of the sheath case 1. The vibration motor 1 is held and fixed in the vertical direction of the electronic clinical thermometer between the lid member 15 and the bottom surface of the motor storage recess of the second holding portion 13b with the upper surface 1a and the lower surface 1b of the sheath case arranged upward and downward, respectively.

The battery storage portion 4 may be formed in the sheath case 1, in place of the inside frame 13.

Figure 4:
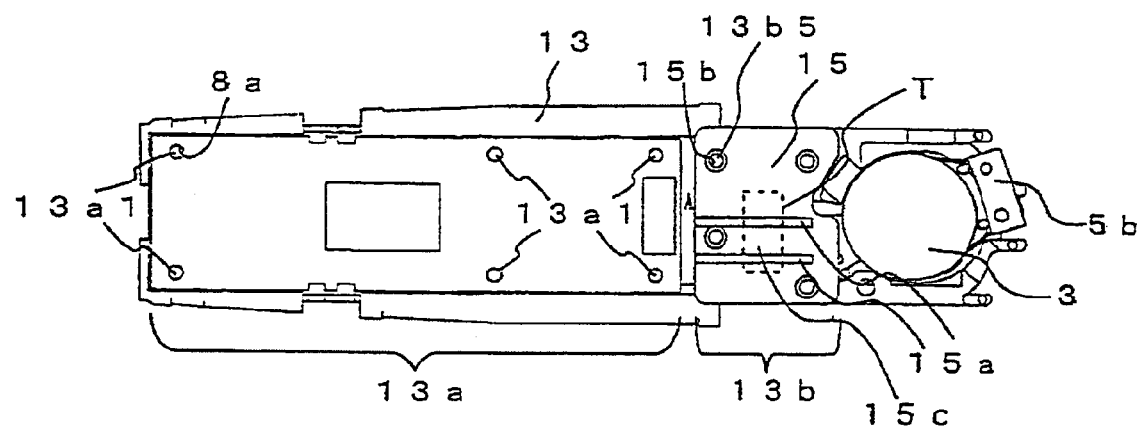
FIG. 4 is a bottom view of an inside frame shown in FIG. 2.
Figure 5:
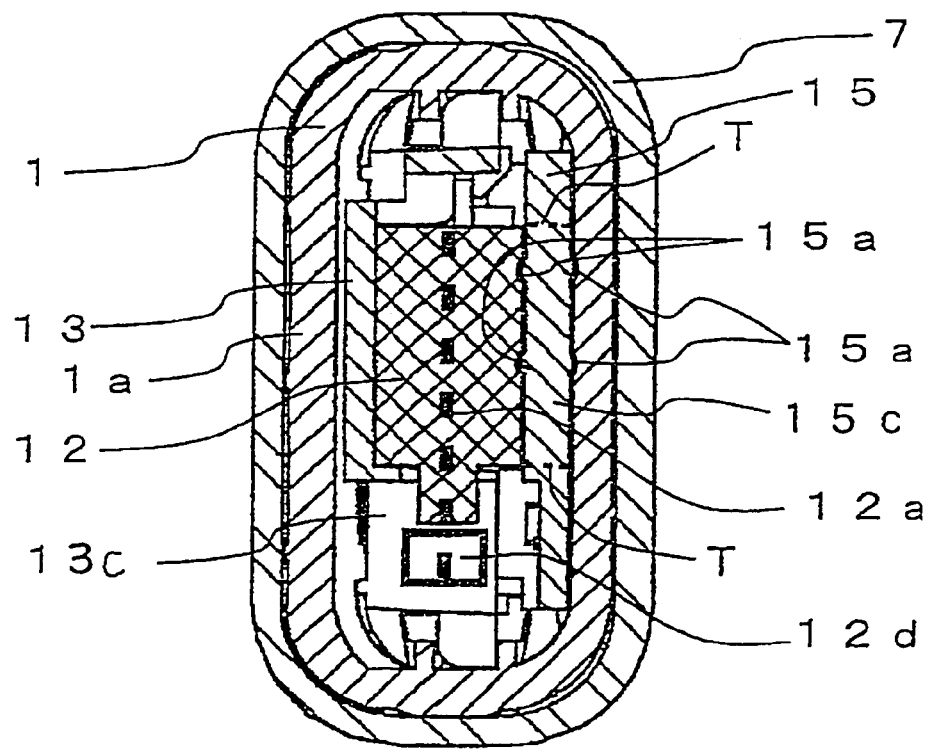
FIG. 5 is a sectional view taken along line C-C of FIG. 1.

As shown in FIG. 7, a plurality of vertically extending ridge portions 13b2 are formed on the wall surface 13b1 of the second holding portion 13b of the inside frame 13. As shown in FIGS. 4 and 5, moreover, a plurality of ridge portions 15a are formed on both obverse and reverse surfaces of the lid member 15 so as to extend in the longitudinal direction of the sheath case 1. The vibration motor 12 that is stored in the second holding portion 13b has its side face in engagement with the ridge portions 13b2 of the second holding portion 13b and the ridge portions 15a of the lid member 15. Further, the lid member 15 engages the lower inner side face of the sheath case 1 through the ridge portions 15a.

Figure 3:
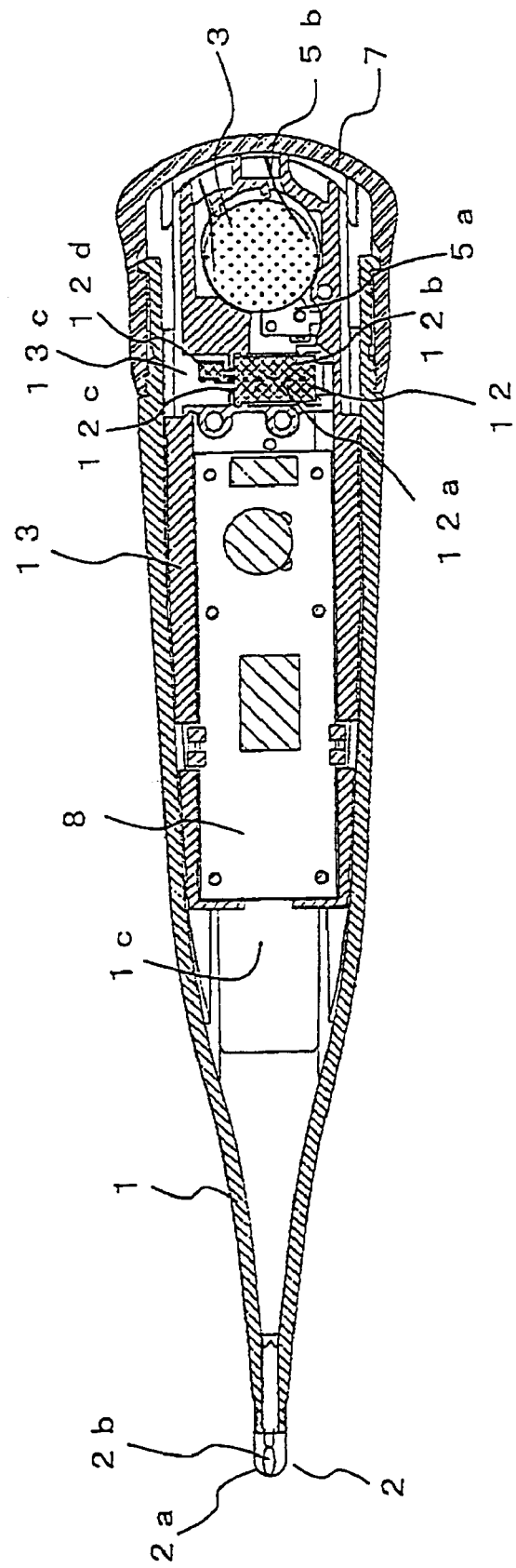
FIG. 3 is a sectional view taken in the longitudinal direction of the electronic clinical thermometer of FIG. 1 (sectional view perpendicular to line A-A of FIG. 1)

As shown in FIGS. 3 and 5, the vibration motor 12 has a body portion 12b in the shape of a rectangular parallelepiped, a rotating shaft 12a, a cylindrical guide portion 12c for guiding a projecting portion on one end side of the rotating shaft 12a, and an eccentric weight 12d that is attached to the one end (projecting portion) of the rotating shaft 12a and rotates around the rotating shaft.

The vibration motor 12 constructed in this manner is housed in the second holding portion 13b of the inside frame 13. As shown in FIG. 5, it is supported in the vertical direction of the electronic clinical thermometer shown in FIG. 2 by the bottom surface portion 13b3 of the inside frame 13 and a support portion 15c (that part of the lid member 15 which overlaps the body portion 12b of the vibration motor 12 flat) surrounded by dotted line T.

Since the vibration motor 12 is provided with the eccentric weight 12d that rotates around the rotating shaft 12a, it has an external shape extending long in the direction of the rotating shaft 12a. This vibration motor 12 is stored in the second holding portion 13b so that its rotating shaft 12a extends at right angles to the longitudinal direction of the electronic clinical thermometer. Further, the vibration motor 12 is located as close to the circuit board 8 as possible. Furthermore, the second holding portion 13b has an escape portion 13c formed of a notch or recess lest the eccentric weight 12d interfere with it when the rotating shaft 12a of the vibration motor 12 is rotated.

When the vibration motor 12 is in the motor storage recess of the second holding portion 13b with the lid member 15 attached to the motor storage recess, vibration that is produced when the vibration motor 12 is actuated is transmitted to the sheath case 1 through the second holding portion 13b and the lid member 15, so that a user who touches the sheath case 1 can sense the vibration.

If the operation switch 11 of the electronic clinical thermometer is depressed, the vibration motor 12 operates for a fixed time, thereby vibrating the sheath case 1. The moment the vibration is generated, all display patterns on the liquid crystal display panel 9 glow (all-lit-up display), and thereafter, a last measured value is displayed (last value display). The vibration of the sheath case 1 caused by the vibration motor 12 lasts for about 0.1 second, while both the all-lit-up display and the last value display last about 2 or 3 seconds. The user recognizes the start of measurement by sensing the vibration, and puts the clinical thermometer in an armpit, a target region of temperature measurement, after observing the last measured value.

After the last measured value is displayed on the liquid crystal display panel 9, temperature measuring operation is started by the use of the thermistor 2b. The temperature measuring operation is performed continuously at given time intervals. A detected temperature that is higher than a given value is displayed on the liquid crystal display panel 9. If a change in the detected temperature with respect to time gets lower than a given value (i.e., if a stable detection is made) and the temperature measuring operation is finished, then the vibration motor 12 automatically vibrates for about 3 seconds. In consequence, the user is notified of an end of the body temperature measurement by the vibration of the sheath case 1. Then, the user takes out the electronic clinical thermometer from the armpit and reads a temperature displayed on the liquid crystal display panel 9. If the operation switch 11 is depressed after the notification by the vibration motor 12, the sheath case 1 vibrates for about 0.1 second, and the power is then turned off.

The following is a description of examples of how to hold the electronic clinical thermometer for operating the operation switch 11 of the electronic clinical thermometer naturally and smoothly.

Figure 8:
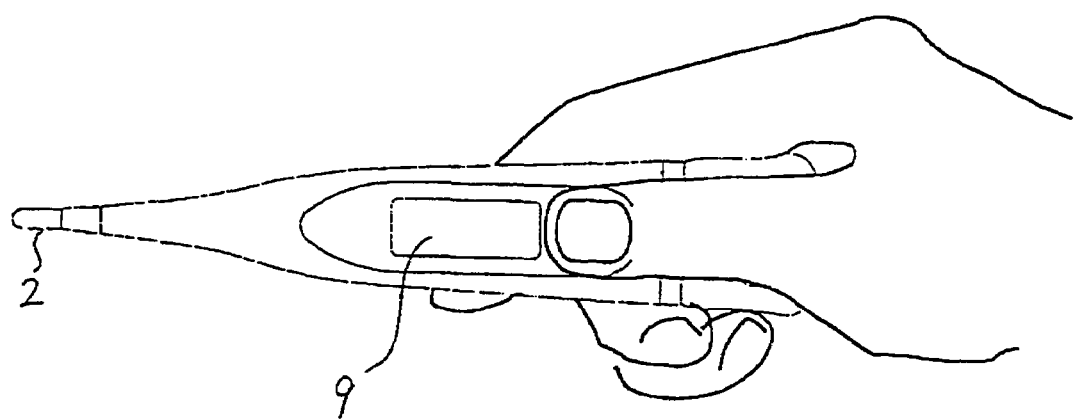
FIG. 8 shows a first example of a style in which the electronic clinical thermometer is held by a right hand.

In a first example of the style of holding the electronic clinical thermometer, as shown in FIG. 8, a thumb is stretched substantially in the same direction as the longitudinal direction of the body of the electronic clinical thermometer and held against the operation switch 11. That part of a middle finger which is situated between its first and second joints is held against that part of the reverse surface of the sheath case 1 between the operation switch 11 and the battery 3. Further, that part of a forefinger near its first joint is held against the reverse surface of the sheath case 1.

Figure 9:
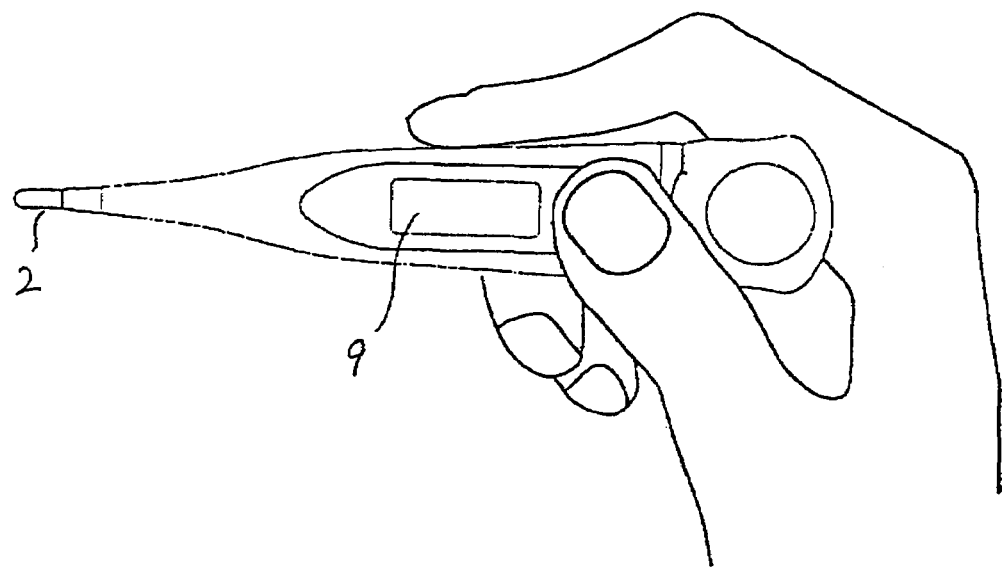
FIG. 9 shows a second example of the style in which the electronic clinical thermometer is held by the right hand.
Figure 10:
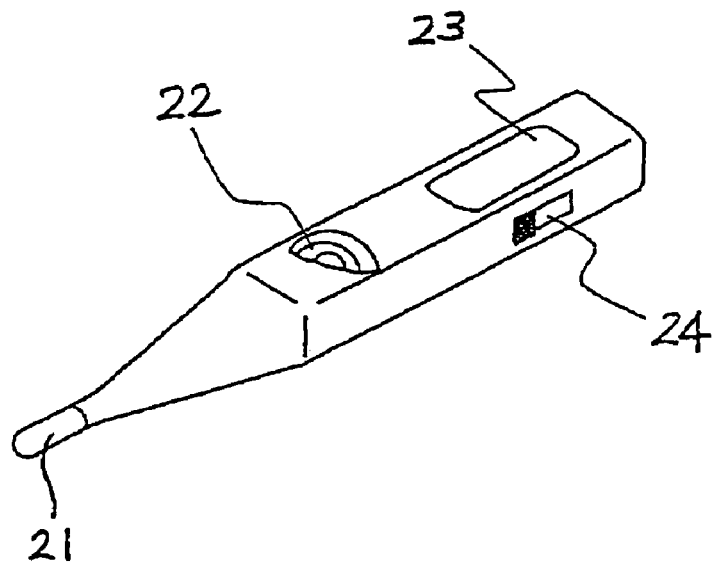
FIG. 10 is a perspective view showing a first prior art example of a clinical thermometer having a vibration generator.
Figure 11:
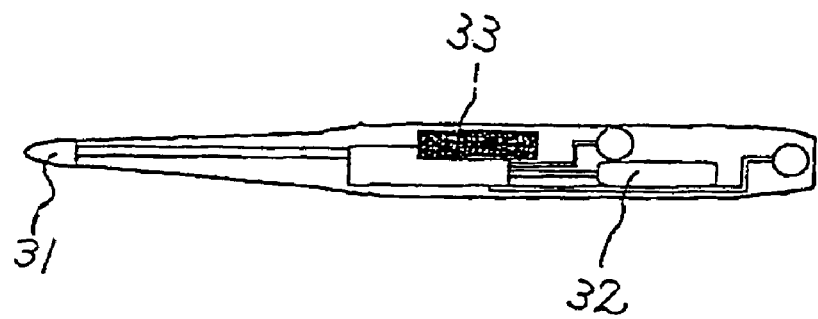
FIG. 11 is a sectional view showing a second prior art example of the clinical thermometer having the vibration generator.
Figure 12:
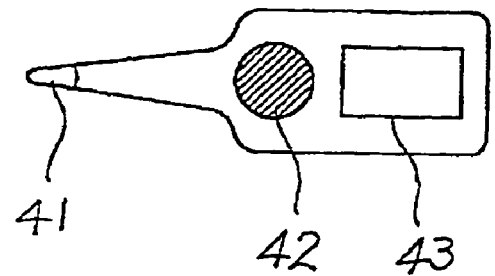
FIG. 12 is a plan view showing a third prior art example of the clinical thermometer having the vibration generator.

In a second example of the style of holding the electronic clinical thermometer, as shown in FIG. 9, the thumb is held against the operation switch 11 with the end portion of the electronic clinical thermometer on the side of the battery storage portion 4 put on the basal part of the forefinger. The middle finger is held against the reverse surface of the liquid crystal display panel 9 of the sheath case 1. Further, the forefinger is laid on a side face of the sheath case 1.

With these holding styles or somewhat modified holding styles, the liquid crystal display panel 9 can be smoothly brought to a readable position in front of the face of the user in a natural posture. (It is to be supposed, however, that characters displayed on the liquid crystal display panel 9 are oriented in the same direction as numerals 2 and 9 of FIGS. 8 and 9, and that the vertical direction of the characters is coincident with the vertical direction of the drawings.) Further, the electronic clinical thermometer may be also put directly into the armpit or the target region of temperature measurement without being shifted. In these holding styles, the vibration motor 12 is situated corresponding to or near those parts which are grasped or touched by a hand, so that the respective positions of the vibration motor 12 and the hand (or fingers) are so close to each other that vibration is easily transmitted to the hand.

Thus, in the present embodiment, the operation switch 11 is located behind the liquid crystal display panel 9 (in a manner such that it recedes from the temperature measuring element 2a in the longitudinal direction of the electronic clinical thermometer), and the vibration motor 12 is further located behind the operation switch 11. If the electronic clinical thermometer is held with a finger on the operation switch 11 lest the hand covers the liquid crystal display panel 9, therefore, regions near the vibration motor 12 that is situated on the side opposite from the liquid crystal display panel 9 are grasped or touched naturally, so that vibration is easily transmitted to the hand. If the operation switch 11 and the motor 12 are interchanged in position, moreover, the forefinger touches a position near the motor 11 when the thermometer is held in the manner shown in FIG. 8 (or when the thumb is held against the shifted operation switch 11). When the thermometer is held in the manner shown in FIG. 9 (or when the thumb is held against the shifted operation switch 11), on the other hand, the middle finger touches a region near the motor 11. In either case, the vibration of the motor 11 is easily transmitted to the hand.

Thus, the operation switch 11 and the motor 12 are arranged on one side of the liquid crystal display panel 9 with respect to the longitudinal direction of the electronic clinical thermometer, so that the operation switch 11 and the motor 12 are located relatively close to each other. If the electronic clinical thermometer is held in a manner such that the operation switch 11 can be naturally operated with smoothness, therefore, the vibration can be transmitted with ease.

In the present embodiment, as described above, moreover, vibration is generated when the operation switch 11 is depressed, so that the intensity of the vibration can be bodily sensed in advance before the start of body temperature measurement. Thus, the vibration can be easily sensed when the measurement is completed.

In the present embodiment, furthermore, the circuit board 8 and the vibration motor 12 are spaced from each other lest the vibration of the vibration motor 12 be transmitted directly to the electronic components mounted on the circuit board 8. Thus, the electronic components can be prevented from being damaged or degraded by the vibration, so that the reliability of the electronic components can be secured, and the product lifetime can be guaranteed for a long time.

In the present embodiment, furthermore, the battery storage portion 4 is located at the rear end portion of the electronic clinical thermometer, so that various battery loading/unloading systems can be subjected to smooth free selection. For example, the cap 7 may be provided with a holding portion for holding the battery 3 so that the cap 7 can be attached to or detached from the sheath case 1 with the battery 3 held in the holding portion. In this case, battery conduction is made between the sheath case 1 and the cap 7 when the cap 7 is attached to the sheath case 1. In battery replacement, the battery held in the holding portion of the cap 7 can be taken out by disengaging the cap 7 from the sheath case 1.

In the embodiment shown in FIGS. 1 and 2, the liquid crystal display panel 9, operation switch 11, and vibration motor 12 are arranged in the order named in a manner such that they recede from the temperature measuring element 2a in the longitudinal direction of the electronic clinical thermometer. In contrast with this, however, the vibration motor 12, operation switch 11, and liquid crystal display panel 9 may be arranged in the order named in a manner such that they recede from the temperature measuring element 2a in the longitudinal direction of the electronic clinical thermometer. Thus, even in the case where the vibration motor 12 and the operation switch 11 are located on the side of the temperature measuring portion 2 of the liquid crystal display panel 9, vibration can be easily transmitted to the hand, and the characters displayed on the liquid crystal display panel 9 can be easily read with the thumb of the left hand on the operation switch 11 and with the remaining fingers on the temperature measuring portion side.

In the present embodiment, the circuit board 8 (and the liquid crystal display panel 9) and the vibration motor 12 are prevented from overlapping in the thickness direction of the electronic clinical thermometer, so that the thickness of the electronic clinical thermometer can be reduced. Since the vibration motor 12 is located so that its rotating shaft 12a extend at right angles to the longitudinal direction of the electronic clinical thermometer, moreover, the longitudinal dimension of the electronic clinical thermometer can be made shorter than in the case where the direction of the rotating shaft 12a is parallel to the longitudinal direction of the electronic clinical thermometer.

Since the electronic clinical thermometer according to the present invention can be reduced in thickness and length in this manner, it can be miniaturized, so that the vibration of the vibration motor 12 can be efficiently transmitted to the user.

According to the present invention, the circuit board 8, liquid crystal display panel 9, vibration motor 12, and battery storage portion 4 are held in the single inside frame 13. Therefore, the circuit board 8, liquid crystal display panel 9, vibration motor 12, and battery storage portion 4 can be easily incorporated into the sheath case 1 by incorporating these components into the inside frame 13 and storing the inside frame 13 into the sheath case 1. Further, abnormal vibration can be easily detected, since the vibration motor 12 and other necessary components can be held in the inside frame 13 as they are checked before they are stored into the sheath case 1.

As shown in FIG. 2, the lid member 15 engages and is supported by the lower inner side face of the sheath case 1, so that the vibration of the vibration motor 12 is transmitted directly to the sheath case 1. If that part of the sheath case 1 which engages the lid member 15 or its vicinity is situated in a position such that the user can easily touch the operation switch 11 to operate it with a finger, the vibration can be easily transmitted to the finger as the operation switch 11 is operated. When the operation switch 11 is operated, the electronic clinical thermometer is held with the liquid crystal display panel 9 upward, so that a finger can easily touch the outer surface of the underside of the sheath case 1 of the electronic clinical thermometer, and the vibration of the vibration motor 12 is transmitted to that finger through the lid member 15.

If the lid member 15 that supports the vibration motor 12 is caused to engage the inner surface of the sheath case 1, in a state where the lid member 15 is fixed to the second holding portion 13b of the inside frame 13, in particular, moreover, a fixed part of the lid member 15 can be made reluctant to slacken even when the vibration motor 12 is driven. Since the second holding portion 13b of the inside frame 13 also engages, and is supported by, the inner surface of the sheath case 1 through the lid member 15, the second holding portion 13b and the components held thereby can be prevented from vibrating in the sheath case 1. Further, vibration of the inside frame 13 in the sheath case 1 may be prevented by configuring the first holding portion 13a and/or the second holding portion 13b of the inside frame 13 itself such that it engages, and is supported by, the inner surface of the sheath case 1.

The invention claimed is:

1. An electronic clinical thermometer for measuring a body temperature of an organism, which comprises a temperature measuring element for detecting a temperature, a display device for displaying the temperature measured by the temperature measuring element, an operation switch for predetermined operation, and a vibration generator for notifying that the electronic clinical thermometer is in a predetermined state, wherein the electronic clinical thermometer has a width, a thickness, and a longitudinal length longer than said width and said thickness, and the operation switch and the vibration generator are arranged on one side of the display device in the longitudinal direction of the electronic clinical thermometer, further wherein the vibration generator is a vibration motor having a rotating shaft and an eccentric weight rotatable around the rotating shaft and extending long in the direction of the rotating shaft, and the vibration motor is located so that the rotating shaft thereof extends at right angles to the longitudinal direction of the electronic clinical thermometer.

2. The electronic clinical thermometer according to claim 1, wherein the electronic clinical thermometer has a battery storage portion for storing a battery, and the battery storage portion is located on the side opposite the temperature measuring element with respect to the vibration generator.

3. The electronic clinical thermometer according to claim 1, wherein the operation switch is a switch for starting temperature measuring operation, and the vibration generator is actuated before measurement is started after the operation switch is operated.

4. The electronic clinical thermometer according to claim 1, wherein the electronic clinical thermometer has a circuit board on which given electronic components are mounted, and the circuit board is located in a position apart from the vibration generator.

5. The electronic clinical thermometer according to claim 4, wherein the circuit board is located so as not to overlap the vibration generator on a plane in the thickness direction thereof.

6. The electronic clinical thermometer according to claim 1, wherein the electronic clinical thermometer has an inside frame for holding the vibration generator.

7. The electronic clinical thermometer according to claim 6, wherein, the inside frame is formed with a notch portion or a recess, and the eccentric weight of the vibration motor is located in the notch portion or the recess.

8. The electronic clinical thermometer according to claim 6, wherein the inside frame further holds a circuit board.

9. The electronic clinical thermometer according to claim 6, wherein the inside frame further holds the display device.

10. The electronic clinical thermometer according to claim 6, wherein the inside frame further has a holding portion for holding a battery.

11. The electronic clinical thermometer according to claim 6, wherein the inside frame has a first support portion and a second support portion for supporting the vibration generator in the vertical direction of the electronic clinical thermometer.

12. The electronic clinical thermometer according to claim 11, wherein the electronic clinical thermometer has a sheath case for holding the inside frame, and the first support portion or the second support portion is supported by the inner surface of the sheath case.

13. The electronic clinical thermometer according to claim 12, wherein the sheath case has a front portion located so that a display panel of the display device can be visually confirmed and a rear portion situated at the back of the front portion, and the first support portion or the second support portion is supported by the inner surface of the rear portion of the sheath case.

14. The electronic clinical thermometer according to claim 12, wherein the inside frame is fitted with a lid, so that the first support portion is provided on the inside frame, the second support portion is provided on the lid, and only the second support portion is supported by the inner surface of the sheath case.

* * * * *